P. S. MOYER.
MEANS FOR PRESERVING PREPARED CEREAL, CEREAL PRODUCTS, AND THE LIKE.
APPLICATION FILED AUG. 25, 1916.
1,222,656.
Patented Apr. 17, 1917.
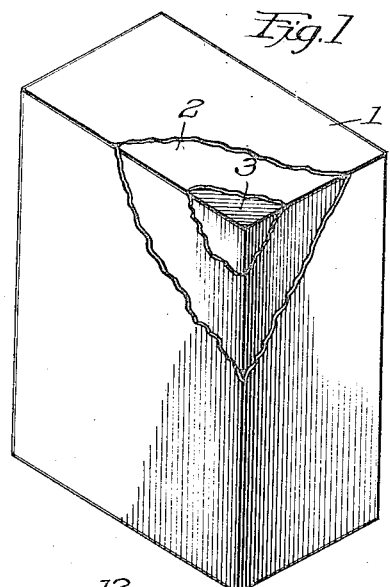
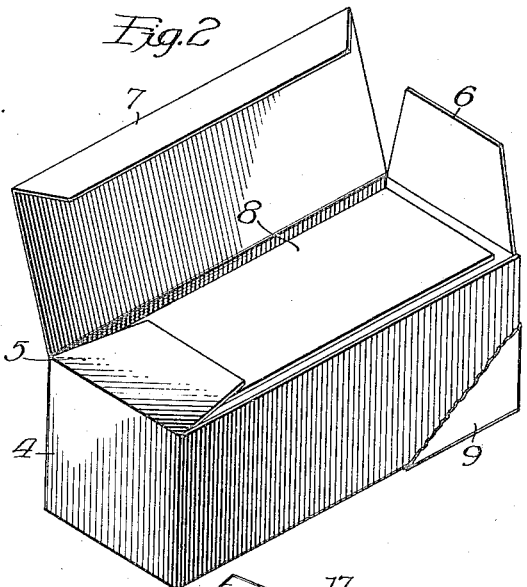
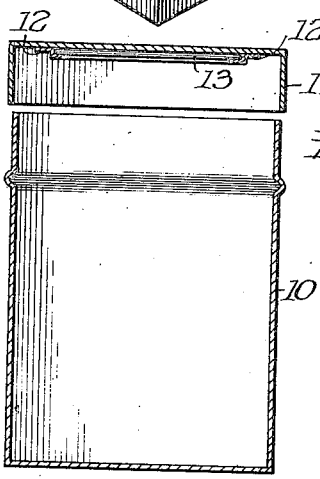
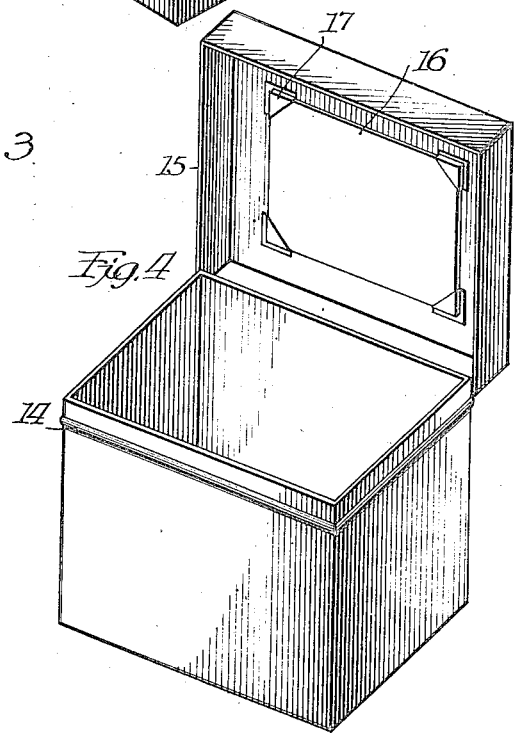
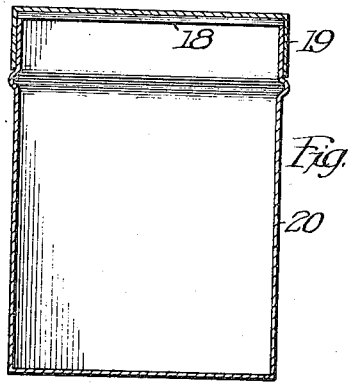
Inventor
Paul S. Moyer
By Brown, Hanson & Boettcher
Attys

UNITED STATES PATENT OFFICE.

PAUL S. MOYER, OF CHICAGO, ILLINOIS, ASSIGNOR TO THE ARIDOR COMPANY, OF CHICAGO, ILLINOIS, A CORPORATION OF ILLINOIS.

MEANS FOR PRESERVING PREPARED CEREAL, CEREAL PRODUCTS, AND THE LIKE.

1,222,656.    Specification of Letters Patent.    Patented Apr. 17, 1917.

Application filed August 25, 1916. Serial No. 116,854.

*To all whom it may concern:*

Be it known that I, PAUL S. MOYER, a citizen of the United States, residing at Chicago, in the county of Cook and State of Illinois, have invented a certain new and useful Improvement in Means for Preserving Prepared Cereals, Cereal Products, and the like, of which the following is a full, clear, concise, and exact description, reference being had to the accompanying drawings, forming a part of this specification.

This invention provides a method of and means for preserving and rendering palatable prepared cereals, cereal products and the like.

I have found that prepared cereals and cereal products lose their crispness and become relatively unpalatable when the same are exposed to the open atmosphere. The atmosphere normally contains a relatively large amount of moisture, the exact quantity or percentage of which may vary over a wide range. Food products, particularly of the type known as prepared cereals or cereal products when exposed to the atmosphere absorb a certain amount of the moisture and become tough, soggy and unpalatable.

It has been proposed heretofore to drive off the moisture from such articles by heating the same in an oven. This is unsatisfactory for a number of reasons. First, although the article is heated to quite a high temperature it does not necessarily follow that the moisture has been driven off. Heating of the articles to the point where the moisture begins to leave generally produces marked changes in the properties, food value and taste of the article. In addition it is to be noted that it is very often inexpedient, if not impossible, to subject the article to the required heat.

In accordance with my invention the cereals or cereal products are always maintained in a perfect condition by inclosing the same in a substantially inclosed or dead atmosphere and then treating the atmosphere which surrounds the food products with a de-hydrating or hygroscopic material which removes most if not all of the moisture in this dead air space or inclosed atmosphere. The food products in turn tend to give off to the dry atmosphere any moisture which they may contain and are thus preserved in proper condition at all times. The hygroscopic or de-hydrating material is held in a suitable carrier in order to be capable of easy and convenient handling. When the hygroscopic material begins materially to lose its properties it is treated by subjecting the same to a relatively high temperature which drives off the moisture and renders the material active for the purpose desired.

In the accompanying drawings I have illustrated a number of different ways in which my invention may be carried out. I do not intend to be limited to the precise details shown and described as the following description is not intended as a limitation but as explanatory of one or more particular ways in which the invention may be utilized.

Figure 1 is a perspective view, with parts broken away, of a box or container comprising an inner lining bearing a hygroscopic material;

Fig. 2 is a perspective view of a cardboard box adapted to contain food products, such as biscuits, and employing a de-hydrating or hygroscopic pad at the open side of the box;

Fig. 3 is a vertical cross section of a metal box having a pad of hygroscopic material secured to the inside of the lid thereof;

Fig. 4 is a perspective view of a metal box having a hinged cover, to the inside of which is secured a hygroscopic pad;

Fig. 5 is a vertical cross section of a box similar to that shown in Fig. 3 in which, however, the hygroscopic pad becomes a seal between the outside atmosphere and the dead atmosphere contained within the box.

The box shown in Fig. 1 is of the type adapted to contain prepared cereals or cereal products as grain flakes, grape-nuts, wheat biscuits, puffed rice and the like. This box comprises an outer cardboard shell 1 which may be constructed in any preferred manner but being made sufficiently tight as to preserve substantially a dead atmosphere within the same after the food products have been placed inside and the box sealed, or otherwise closed.

This box is self sustaining as distinguished from a flexible wrapping or inclosing carton which is held distended by the article contained.

Within the outer box 1, I place a lining 2, having hygroscopic properties. This material comprises essentially an inert or relatively inert carrier and an active material having hygroscopic properties. The carrier may be made of paper, cardboard, asbestos board, a textile or woven material, or any fabric having a porous body which is substantially inert to the action of the hygroscopic material which is incorporated within it.

I have found that calcium chlorid is a suitable material for impregnating the carrier 2 to render the same hygroscopic. In preparing the de-hydrating pad, I prepare a strong solution of the salt and impregnate the body of the pad with the same, either by dipping, spraying or the like. The excess moisture is then removed by evaporation and the pad is finally dried by heating in an oven at a temperature sufficiently high to drive off the greater part of the moisture, thereby rendering the pad de-hydrating in its properties. The hygroscopic material is thus contained in the fibrous body in a minutely divided state in ideal condition for the purpose indicated. The surfaces of the individual fibers are coated by the deposited material. In the container shown in Fig. 1, I purposely employ a lining 3 of thin paper to maintain the de-hydrating pad out of contact with the particular goods employed in the container. It is to be understood, however, that this lining is unnecessary.

When the food articles are prepared they are placed within the container 1 and are surrounded either in whole or in part by the de-hydrating pad 2 and the container 1 is then closed sufficiently tight to maintain a substantially dead body of air about the particular goods. Any moisture which may be carried by a small leakage of air through the box 1 is immediately taken up by the pad 2 and does not act upon the particular goods. The pad 2 thus becomes an effective barrier between the atmosphere and the goods preventing the entry of moisture. At the same time any moisture that may have been carried in with the food products is subjected to the drying properties of the pad 2 whereby such moisture is removed from the food products. The device thereby serves the double purpose of excluding moisture from the outer atmosphere and of withdrawing moisture from the interior atmosphere within which the goods are inclosed.

In Fig. 2 I have illustrated a type of container such as is employed particularly for inclosing biscuits, crackers, wafers and the like. In this case the outer pasteboard shell or box 4 is provided with suitable end flaps 5 and 6 and a closing flap 7 which are adapted to close the top of the box. A de-hydrating pad 8 is laid over the goods at the open end of the box, after which the flaps 5, 6 and 7 are closed. The outside of the box is then wrapped with a thin paper 9 which completely closes the box. This paper 9 may be made of wax tissue or the like. The action of the container and the de-hydrating pad are the same in this embodiment as explained in connection with Fig. 1.

In Fig. 3 a box or container 10 is formed of sheet metal and is formed with a suitable cover or top 11, which is adapted to slide over and close the open end of the body 10. The de-hydrating pad 13 is secured to the bottom of the lid 11 by means of suitable clips or brackets 12. The pad 13 may be removed from the clips 12 for drying out the pad as above described.

In Fig. 4 I have shown a sheet metal box 14, such as is commonly employed for containing bread, crackers, cake and the like. The hinged cover 15 bears upon its lower or inner side a pad 16 which pad performs the service of maintaining the contents of the box in a relatively dry condition to prevent spoiling of the same. The pad 16 is removably held by suitable clips 17 fastened to the cover of the box.

I have found that it is feasible instead of fastening the de-hydrating pad at any particular part of the box to drop the same loosely within the box even where it is necessary to tear the pad up into smaller pieces to dispose them about the contents of the container. When these pieces have lost their de-hydrating properties they may be renewed by heat treatment, as previously pointed out, or may be thrown away as desired.

In Fig. 5 I have illustrated the manner in which the de-hydrating pad 18 forms a seal between the top 19 and the body 20 of a suitable container. In this case the pad 18 is made coextensive with the interior of the cap or top 19 and thus forms a seal for the container 20.

While I have indicated calcium chlorid as the particular salt which I employ, it is to be understood that there are numerous other substances which have hygroscopic properties and which may be employed in forming the de-hydrating pad.

I am aware that the hygroscopic properties of calcium chlorid have been employed for de-hydrating currents of air and the like by passing the same through the container in which the salt was contained. In the present case, however, movement of the atmospheric air is prevented by maintaining a dead space about the goods and by holding the hygroscopic salt in a suitable carrier whereby a very large area of the substance is exposed and handling of the material in a practical manner is secured.

I claim:

1. In combination, a complete box having closely fitting joints, a dry hygroscopic food product in said box, and a pad of fibrous material having a hygroscopic substance deposited in finely divided form upon the individual fibers thereof to form an extensive surface for the absorbance of moisture, said pad being disposed in said box out of contact with the food product and said substance having a greater affinity for moisture than said food product.

2. In combination a complete box having closely fitting joints and adapted to contain a prepared cereal and a flat pad made of a fibrous material having a hygroscopic substance deposited in finely divided form upon the individual fibers thereof to form an extensive surface for the absorbance of moisture, said pad being supported in said box out of contact with the prepared cereal.

In witness whereof, I hereunto subscribe my name this 18th day of August A. D. 1916.

PAUL S. MOYER.